United States Patent
Nakada et al.

(10) Patent No.: US 8,681,365 B2
(45) Date of Patent: Mar. 25, 2014

(54) DISPLAY CONTROL DEVICE, PRINTING APPARATUS, DISPLAY CONTROL METHOD AND NON-TRANSITORY COMPUTER READABLE MEDIUM STORING PROGRAM

(75) Inventors: Hiroshi Nakada, Yokohama (JP); Kanji Itaki, Yokohama (JP); Kimitake Hasuike, Yokohama (JP); Yasuhiro Hirano, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 61 days.

(21) Appl. No.: 13/543,261

(22) Filed: Jul. 6, 2012

(65) Prior Publication Data
US 2013/0250346 A1 Sep. 26, 2013

(30) Foreign Application Priority Data
Mar. 23, 2012 (JP) .................................. 2012-067829

(51) Int. Cl.
*G06F 15/00* (2006.01)
*G06F 3/12* (2006.01)
*G06K 1/00* (2006.01)

(52) U.S. Cl.
USPC ........................................ 358/1.15; 358/1.13

(58) Field of Classification Search
None
See application file for complete search history.

(56) References Cited

U.S. PATENT DOCUMENTS

| | | | |
|---|---|---|---|
| 2008/0225346 A1 | 9/2008 | Mano et al. | |
| 2013/0050761 A1* | 2/2013 | Nakagiri et al. | 358/1.15 |
| 2013/0278970 A1* | 10/2013 | Hoshi et al. | 358/1.18 |

FOREIGN PATENT DOCUMENTS

| | | |
|---|---|---|
| JP | 2004-102614 A | 4/2004 |
| JP | 2008-226050 A | 9/2008 |
| JP | 2010-028255 A | 2/2010 |
| JP | 2010-116241 A | 5/2010 |

* cited by examiner

*Primary Examiner* — Douglas Tran
(74) *Attorney, Agent, or Firm* — Sughrue Mion, PLLC

(57) ABSTRACT

A display control device includes: an accepting unit that accepts part-designation information for designating plural parts to be printed included in data and processing-designation information for designating print processing that performs predetermined processing on every K parts of the plural parts, where K is an integer not less than 2; a generating unit that generates plural specific images for specifying contents of the plural respective parts designated by part-designation information accepted by the accepting unit; and a controller that, when the accepting unit accepts the processing-designation information, exerts control so that a process for performing an operation to select K specific images from the plural specific images generated by the generating unit and to change a state of the K specific images in accordance with the predetermined process in order while changing the K specific images to be selected is displayed on a display screen.

8 Claims, 15 Drawing Sheets

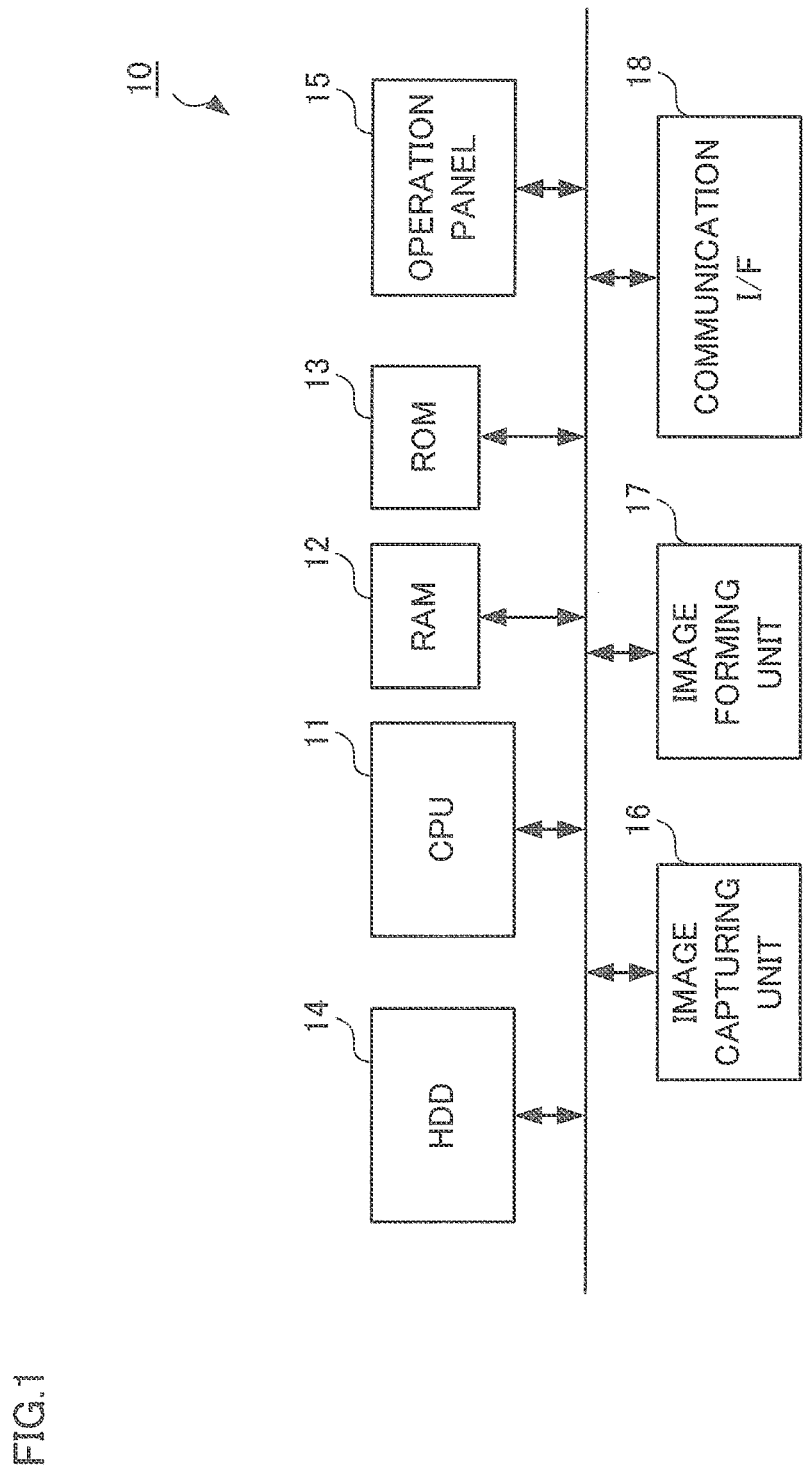

DISPLAY CONTROL DEVICE, PRINTING APPARATUS, DISPLAY CONTROL METHOD AND NON-TRANSITORY COMPUTER READABLE MEDIUM STORING PROGRAM

CROSS REFERENCE TO RELATED APPLICATIONS

This application is based on and claims priority under 35 USC §119 from Japanese Patent Application No. 2012-067829 filed Mar. 23, 2012.

BACKGROUND

1. Technical Field

The present invention relates to a display control device, a printing apparatus, a display control method and a non-transitory computer readable medium storing a program.

2. Related Art

Recently, many techniques have been proposed in which preview display is provided for various settings or states in print processing.

SUMMARY

According to an aspect of the present invention, there is provided a display control device including: an accepting unit that accepts part-designation information for designating plural parts to be printed included in data and processing-designation information for designating print processing that performs predetermined processing on every K parts of the plural parts, where K is an integer not less than 2; a generating unit that generates plural specific images for specifying contents of the plural respective parts designated by the part-designation information accepted by the accepting unit; and a controller that, when the accepting unit accepts the processing-designation information, exerts control so that a process for performing an operation to select K specific images from the plural specific images generated by the generating unit and to change a state of the K specific images in accordance with the predetermined processing in order while changing the K specific images to be selected is displayed on a display screen.

BRIEF DESCRIPTION OF THE DRAWINGS

An exemplary embodiment of the present invention will be described in detail based on the following figures, wherein:

FIG. 1 is a diagram showing an example of a configuration of an image processing device to which the exemplary embodiment according to the present invention is applied;

DETAILED DESCRIPTION

Figure 2A:
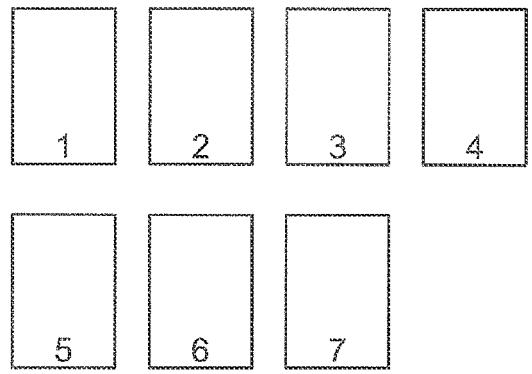
FIGS. 2A to 2F are diagrams showing examples of display of thumbnail images in the case where duplex print (long side binding) is designated.

Hereinafter, an exemplary embodiment according to the present invention will be described in detail with reference to the attached drawings.

FIG. 1 is a diagram showing an example of a hardware configuration of an image processing device 10 to which the exemplary embodiment is applied.

As shown in the figure, the image processing device 10 includes: a central processing unit (CPU) 11; a random access memory (RAM) 12; a read only memory (ROM) 13; a hard disk drive (HDD) 14; an operation panel 15; an image capturing unit 16; an image forming unit 17; and a communication interface (hereinafter, referred to as "communication I/F") 18.

The CPU 11 loads various programs stored in the ROM 13 and the like into the RAM 12, and then executes the programs, thereby to implement functions to be described later.

The RAM 12 is a memory that is used as a working memory or the like for the CPU 11.

The ROM 13 is a memory that stores, therein, the various programs executed by the CPU 11.

The HDD 14 is, for example, a magnetic disk device that stores, therein, image data captured by the image capturing unit 16, image data used for image formation in the image forming unit 17, and the like.

The operation panel 15 is, for example, a touch panel that displays various kinds of information and accepts an operation input by a user. In the exemplary embodiment, the operation panel 15 is provided as an example of a display screen, or as an example of a display unit.

The image capturing unit 16 captures an image recorded on a recording medium such as paper. The image capturing unit 16 herein is, for example, a scanner. The scanner to be used may employ one of the following two systems: a CCD system in which reflected light of light emitted from a light source and directed at an original is reduced by a lens and is then received by charge coupled devices (CCD); and a CIS system in which reflected light of light beams sequentially emitted from LED light sources and directed at an original is received by a contact image sensor (CIS).

The image forming unit 17 forms an image on a recording medium. The image forming unit 17 herein is, for example, a printer. The printer to be used may employ one of the following two systems: an electrophotographic system in which an image is formed by transferring toner attached to a photoconductive drum onto a recording medium; and an ink jet system in which an image is formed by ejecting ink onto a recording medium. In the exemplary embodiment, the image forming unit 17 is provided as an example of a printing unit.

The communication I/F 18 transmits and accepts various kinds of information to and from other devices through a network.

In such an image processing device 10, there are some cases where processing such as duplex print, aggregate print, saddle-stitch bookbinding and combination thereof is designated when instructions for printing of electronic documents are provided from the operation panel 15. Here, "aggregate print" refers to printing of an aggregate of images of plural pages of the electronic document onto one sheet, and in the present specification, aggregate print in which an aggregate of images of N pages of the electronic document is printed on one sheet is especially referred to as "N-page aggregate print".

In the case where the electronic document is printed while designating various kinds of processing in this manner, it is conceivable to display a preview image that indicates a resulting finished state on the operation panel 15.

However, there is a possibility of causing a misprint since it is difficult to straightforwardly understand the finished state only from this display.

Accordingly, in the exemplary embodiment, in displaying the finished state on the operation panel 15, processes leading to the finished state are displayed by animation.

However, a display method of the processes leading to the finished state is different depending on the designated processing.

For example, in the case where the duplex print is designated in printing an electronic document, animation display is performed in which a thumbnail image of a page of the electronic document (hereinafter, referred to as "document image") is attached to a thumbnail image of a page of a sheet (hereinafter, referred to as "sheet image"), and with this state, one sheet image is formed by putting two sheet images together, one of which is on a front side and the other one is on a backside.

Further, in the case where the 2-page aggregate print is designated in printing an electronic document, animation display is performed in which two document images are attached to one sheet image.

On the other hand, in displaying the processes leading to the finished state by animation, if all the thumbnail images are displayed in the case where the number of thumbnail images to be displayed on the operation panel 15 is large, there occurs a problem that the more processing time is required, and thereby efficiency is contrarily deteriorated.

Therefore, in the exemplary embodiment, in the case where the number of thumbnail images to be displayed on the operation panel 15 is large, an intermediate portion sandwiched between an initial portion and a last portion is omitted or made to have a shorter display time. It should be noted that the user may determine whether to carry out such display control on the intermediate portion.

First, a description will be given to examples of display of the thumbnail images in the exemplary embodiment. It should be noted that, in the following display examples, the number of pages to be printed of the electronic document is seven, and all of them are placed in a portrait orientation.

FIGS. 2A to 2F are diagrams showing the display examples of thumbnail images in the case where duplex print (long side binding) is designated.

In an initial state, as shown in FIG. 2A, there are seven document images. It should be noted that the number assigned to each document image indicates the page number of the electronic document, but does not mean that such number is included in each document image.

Here, when instructions of duplex print are accepted, it is determined that there is no instruction of aggregate print, and these document images are switched into the same number of sheet images each of which contains one document image.

Figure 2B:
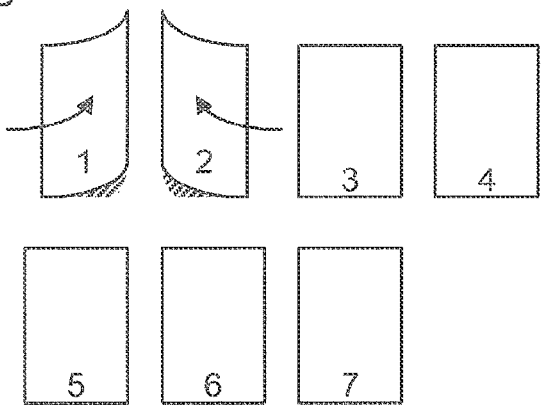

However, in the figure, the document images and the sheet images are shown without distinction. Then, as shown in FIG. 2B, of the seven sheet images, the backside of the first sheet image and the backside of the second sheet image approach and attract each other.

Figure 2C:
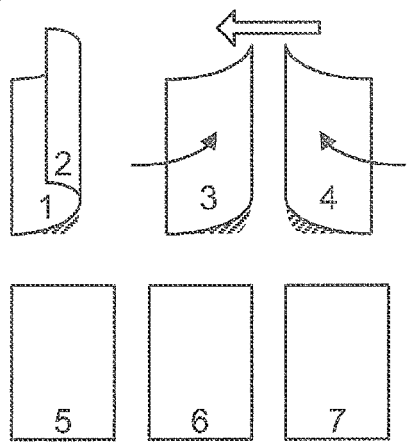

Consequently, as shown in FIG. 2C, the first sheet image and the second sheet image form one sheet image having document images on both sides thereof. The third sheet image and the fourth sheet image have the same behavior as the first sheet image and the second sheet image in FIG. 2B while moving over to the left as indicated by the hollow arrow.

Figure 2D:
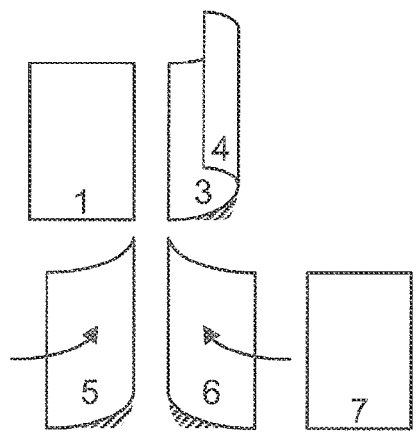

Thereafter, as shown in FIG. 2D, the sheet image formed by adding the first sheet image and the second sheet image is returned to a flat state, and from then on, two of the sheet images approach and repeat the same behavior throughout.

Figure 2E:
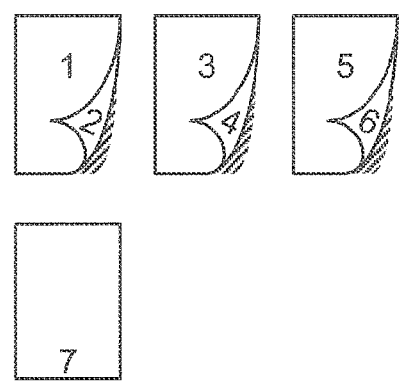

Accordingly, as shown in FIG. 2E, the seven sheet images are organized into four sheet images and properly aligned.

Figure 2F:
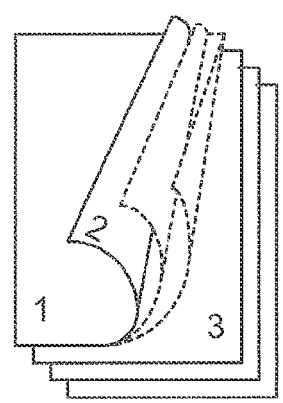

Ultimately, an image is displayed in which the four sheet images are bundled as shown in FIG. 2F.

FIGS. 3A to 3F are diagrams showing the display examples of thumbnail images in the case where 2-page aggregate print is designated.

Figure 3A:
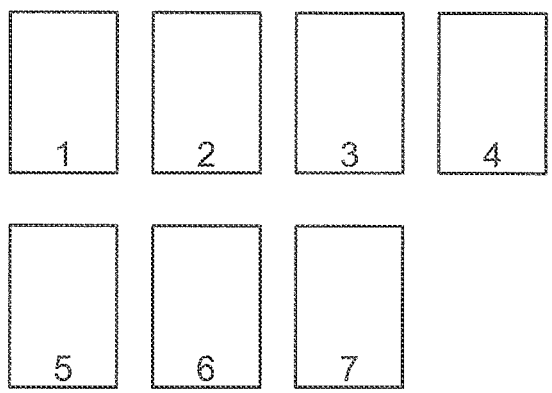
FIGS. 3A to 3F are diagrams showing examples of display of thumbnail images in the case where 2-page aggregate print is designated.

In an initial state, as shown in FIG. 3A, there are seven document images. It should be noted that the number assigned to each document image indicates the page number of the electronic document, but does not mean that such number is included in each document image.

Figure 3B:
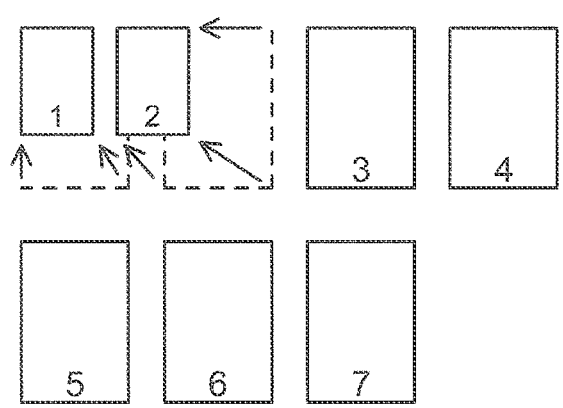

Here, when instructions of 2-page aggregate print are accepted, of the seven document images, the first document image and the second document image approach each other and are reduced as shown in FIG. 3B.

Figure 3C:
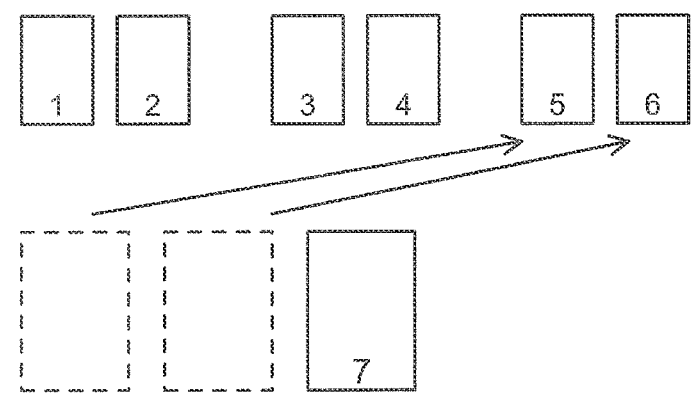

Thereafter, as shown in FIG. 3C, the third document image and the fourth document image as well as the fifth document image and the sixth document image have the same behavior as the first document image and the second document image in FIG. 3B, and the document images are aligned two by two with spacing.

Figure 3D:
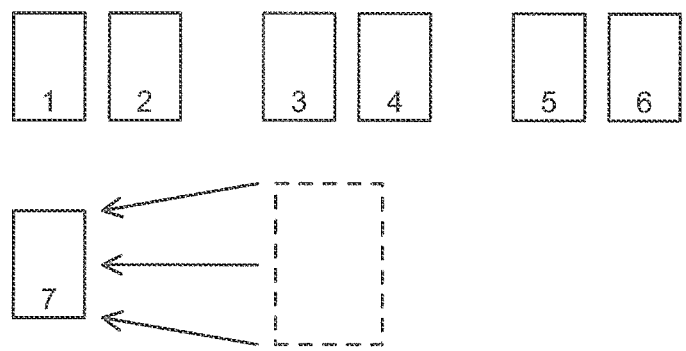

Further, as shown in FIG. 3D, the last document image is moved over to the left.

Figure 3E:
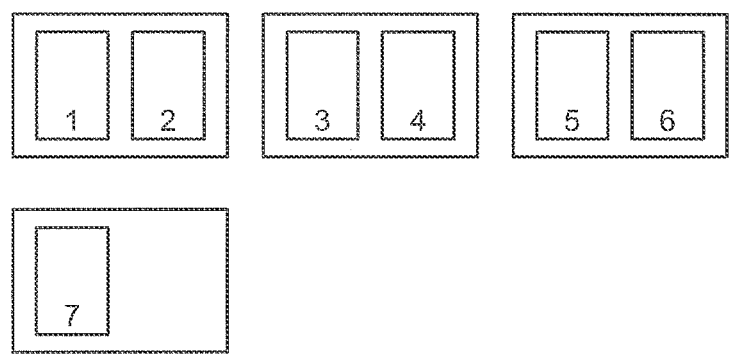

Thereafter, as shown in FIG. 3E, a sheet image appears outside of each pair of aligned document images, to thereby represent that document images of two pages are contained in one sheet.

Figure 3F:
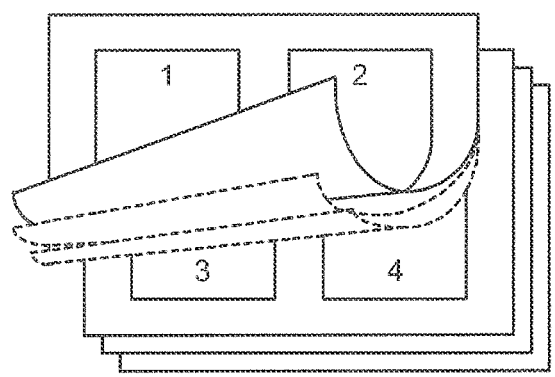

Ultimately, an image is displayed in which the four sheet images are bundled as shown in FIG. 3F.

FIGS. 4A to 4D are diagrams showing display examples of thumbnail images in the case where the duplex print (long side binding) is designated after the 2-page aggregate print is designated.

Until the sheet images are aligned under the instructions of the 2-page aggregate print, display is carried out as shown in FIGS. 3A to 3E.

Figure 4A:
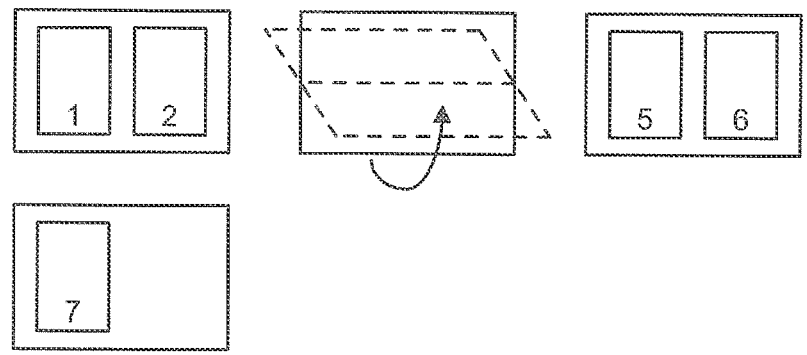
FIGS. 4A to 4D are diagrams showing examples of display of thumbnail images in the case where the duplex print (long side binding) is designated after the 2-page aggregate print is designated.

Here, upon accepting additional instructions of the duplex print, the second sheet image is rotated in the vertical direction and reversed as shown in FIG. 4A.

Figure 4B:
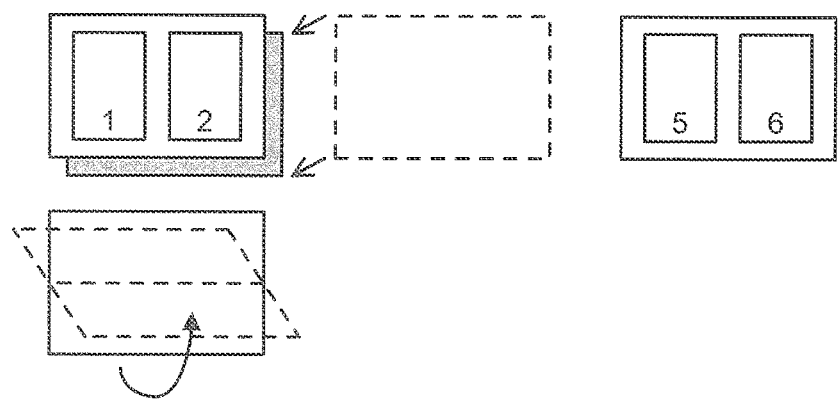

Then, as shown in FIG. 4B, the second sheet image slides into the backside of the first sheet image, and the fourth sheet image is rotated in the vertical direction and reversed.

Figure 4C:
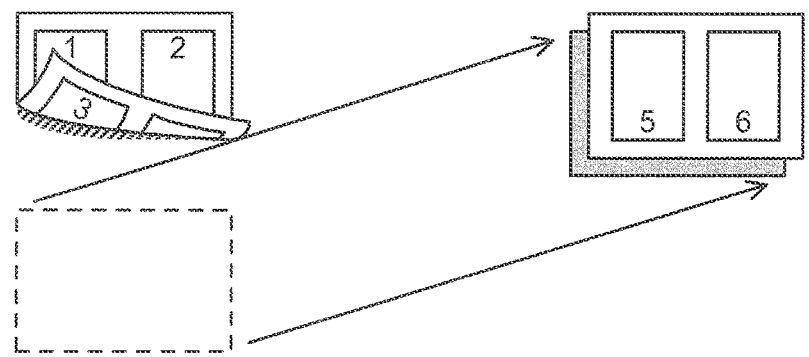

Thereafter, as shown in FIG. 4C, the first sheet image and the second sheet image form one sheet image having document images on both sides thereof. The fourth sheet image also has the same behavior as the second sheet image in FIG. 4B.

Figure 4D:
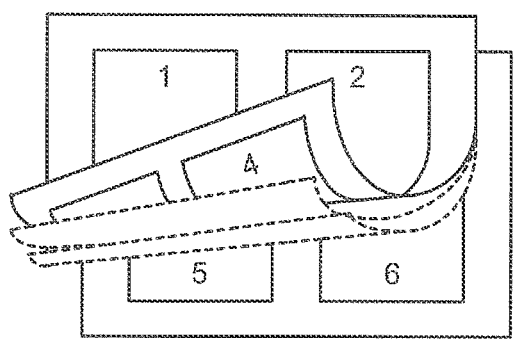

Ultimately, as shown in FIG. 4D, an image is displayed in which four sheet images are bundled.

Figure 5A:
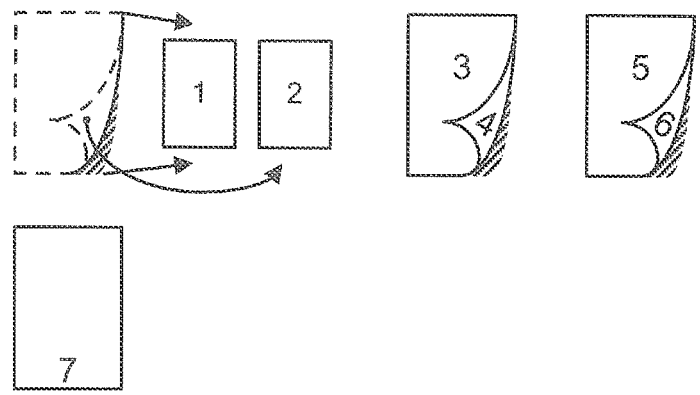
FIGS. 5A to 5C are diagrams showing examples of display of thumbnail images in the case where the 2-page aggregate print is designated after the duplex print (long side binding) is designated.
Figure 5B:
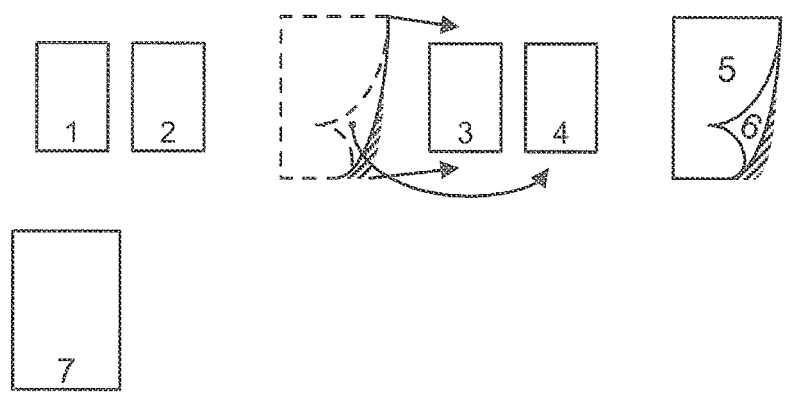
Figure 5C:
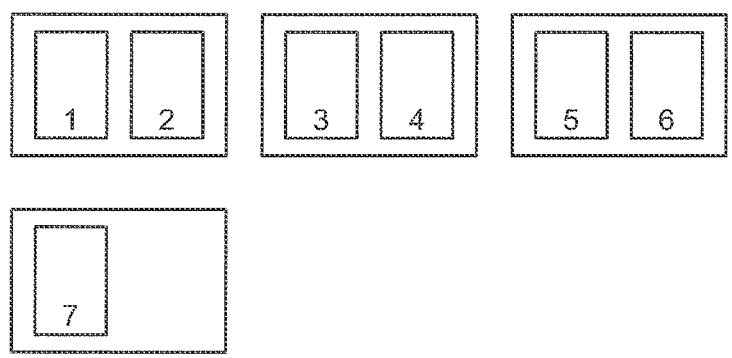

FIGS. 5A to 5C are diagrams showing display examples of thumbnail images in the case where the 2-page aggregate print is designated after the duplex print (long side binding) is designated.

Until the sheet images are aligned under the instructions of the duplex print, display is carried out as shown in FIGS. 2A to 2E.

Here, upon accepting additional instructions of the 2-page aggregate print, the first document image and the second document image attached to both sides of the first sheet image are separated as shown in FIG. 5A.

Further, as shown in FIG. 5B, the first document image and the second document image are aligned as simplex document images, and the second sheet image also has the same behavior as the first sheet image in FIG. 5B.

Thereafter, as shown in FIG. 5C, the same behavior is repeated in all of the sheet images. In the state where the seven document images are aligned, a sheet image appears outside of each pair of aligned document images, to be returned to the state where the sheet images are aligned under the instructions of the 2-page aggregate print right from the start.

Then, from then on, display is carried out as shown in FIGS. 4A to 4D.

That is to say, in the case where multiple sequential processes are performed with regarding designation of the duplex print after designation of the 2-page aggregate print as a forward order and regarding designation of the 2-page aggregate print after designation of the duplex print as a reverse order, the display is once returned to the state where the processes can be executed in the forward order.

FIGS. 6A to 6H are diagrams showing display examples of thumbnail images in the case where saddle-stitch bookbinding is designated.

Figure 6A:
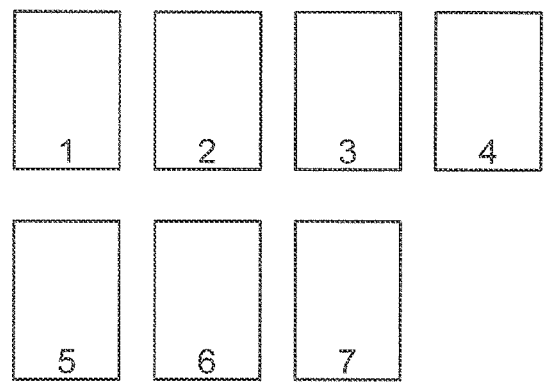
FIGS. 6A to 6H are diagrams showing examples of display of thumbnail images in the case where saddle-stitch book-binding is designated.

In an initial state, as shown in FIG. 6A, there are seven document images. It should be noted that the number assigned to each document image indicates the page number of the electronic document, but does not mean that such number is included in each document image.

Figure 6B:
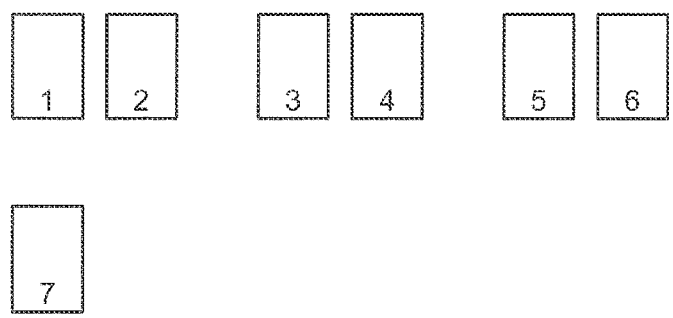

Here, upon accepting instructions of the saddle-stitch bookbinding, after the display in FIGS. 3A to 3D, the seven document images are aligned two by two with spacing as shown in FIG. 6B.

Figure 6C:
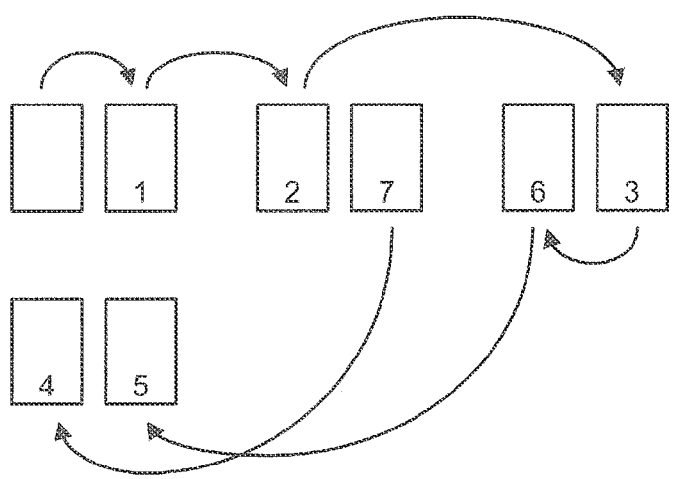

Thereafter, as shown in FIG. 6C, the seven document images move positions such that pages are aligned when bookbinding is performed. It should be noted that, in this specific example, since the last page becomes blank when bookbinding is completed, a blank document image is inserted as the first document image.

Figure 6D:
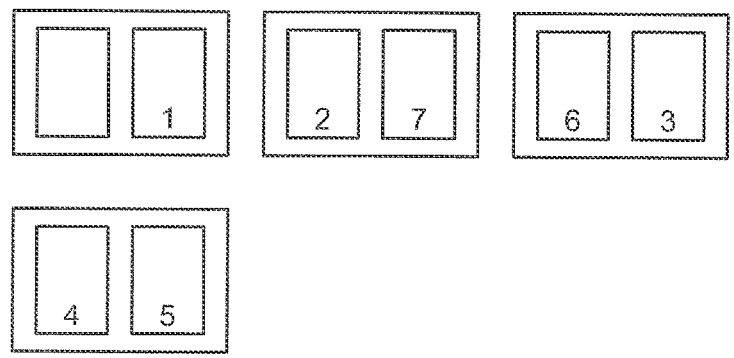

Further, as shown in FIG. 6D, a sheet image appears outside of each pair of aligned document images, to thereby represent that document images of two pages are contained in one sheet.

Figure 6E:
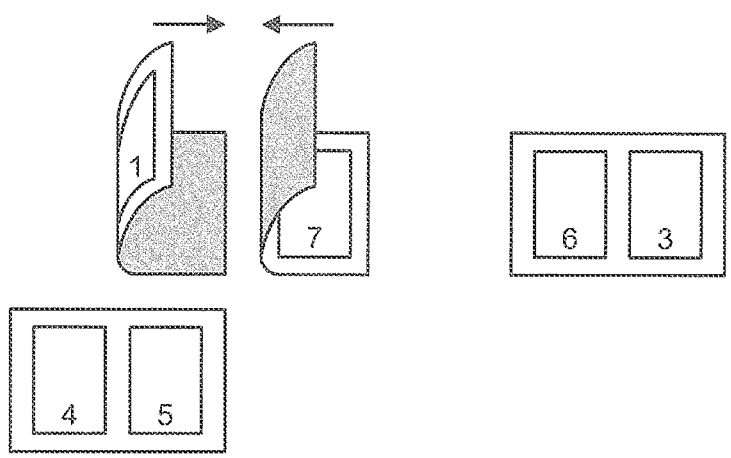

Thereafter, as shown in FIG. 6E, of the four sheet images, the first sheet image and the second sheet image are attracted each other while being folded.

Figure 6F:
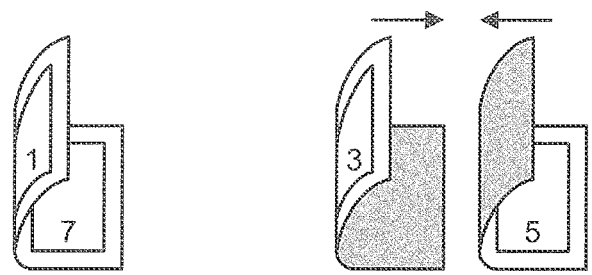

Consequently, as shown in FIG. 6F, the first sheet image and the second sheet image form one sheet image having document images on both sides thereof, and then the third sheet image and the fourth sheet image have the same behavior as the first sheet image and the second sheet image in FIG. 6E to result in two sheet images.

Figure 6G:
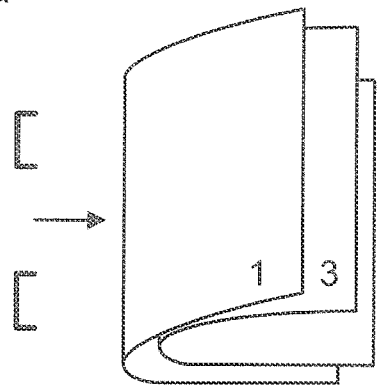

Thereafter, as shown in FIG. 6G, the state of laying the two sheet images and stapling the center thereof is displayed.

Figure 6H:
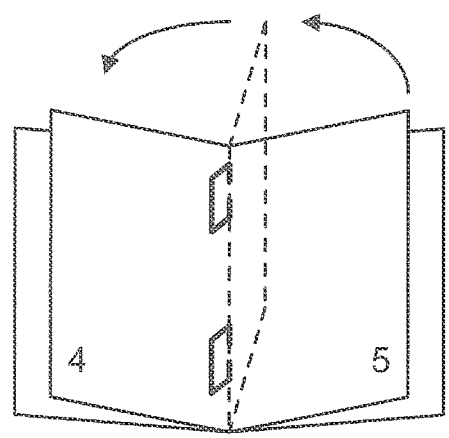

Ultimately, as shown in FIG. 6H, animation display in which pages are turned, though an operation of turning the pages one by one is not executed, is performed.

Next, the image processing device 10 that realizes operations as outlined above will be described in detail.

Figure 7:
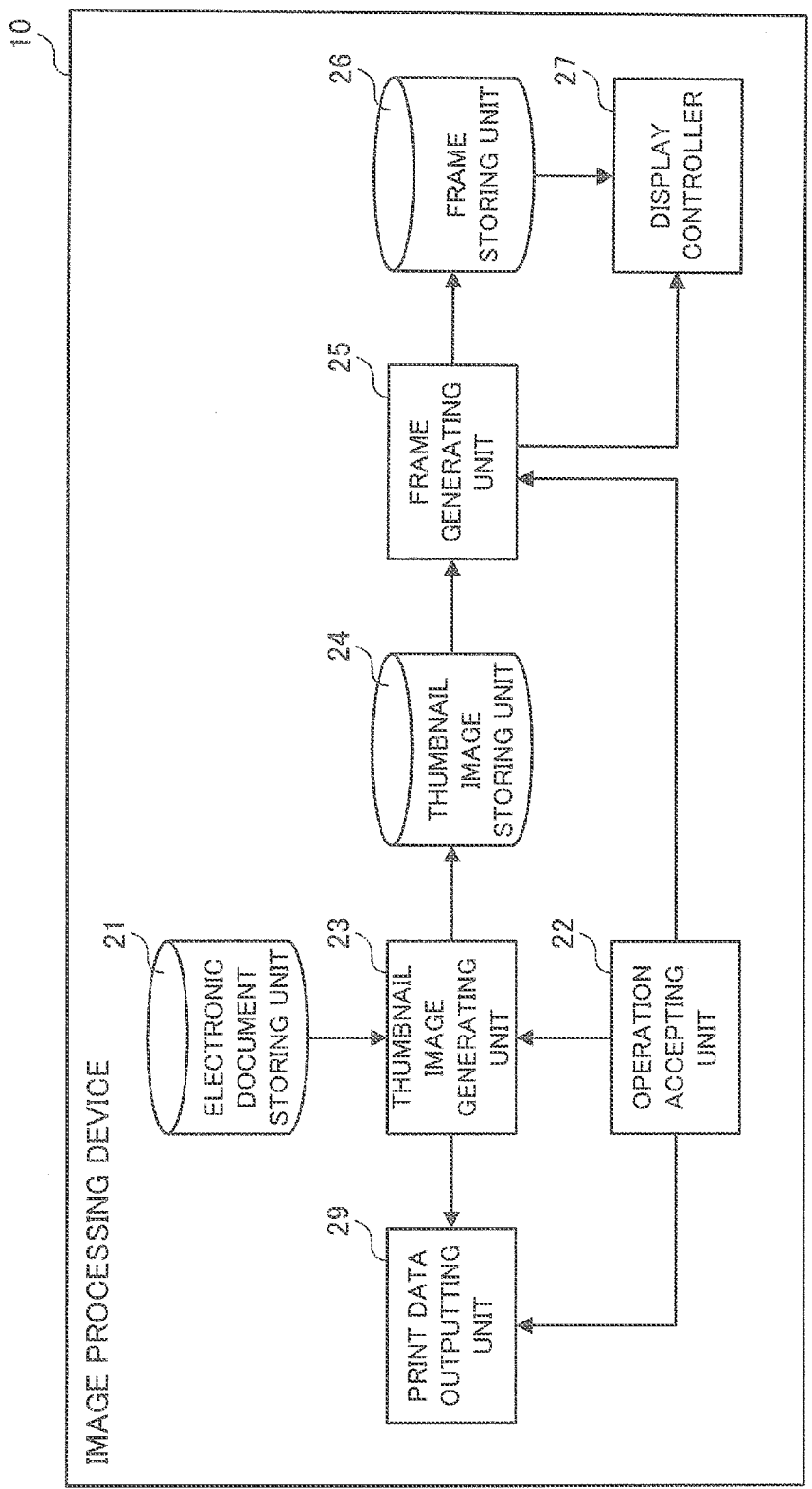
FIG. 7 is a block diagram showing an example of a functional configuration of the image processing device in the exemplary embodiment according to the present invention.

FIG. 7 is a block diagram showing an example of a functional configuration of the image processing device 10.

As shown in the figure, the image processing device 10 includes: an electronic document storing unit 21; an operation accepting unit 22; a thumbnail image generating unit 23; a thumbnail image storing unit 24; a frame generating unit 25; a frame storing unit 26; a display controller 27 and a print data outputting unit 29.

The electronic document storing unit 21 stores the electronic document to be printed. Here, the electronic document to be printed refers to, for example, an electronic document reconstructed based on PDL (page description language) data transmitted from a not-shown PC (personal computer), a PDF file transmitted from a not-shown PC through a PDF direct printing function, and an electronic document captured from a not-shown server computer or mobile terminal. However, "electronic document" in the present specification is not only limited to "document" including texts and subjected to electronization. For example, it is assumed that graphic data such as graphics, and image data such as paintings and photographs are included in "electronic document" regardless of whether it is raster data or vector data. In the exemplary embodiment, the electronic document is used as an example of data.

When an operation is performed on the operation panel 15 by a user, the operation accepting unit 22 accepts information based on the user's operation. For example, if an operation for designating pages to be printed of the electronic document is performed as the user's operation, the page numbers of the designated pages are accepted. Moreover, if an operation for designating print processing (such as the duplex print or the aggregate print) is performed, designation of the print processing (such as the duplex print or the aggregate print) is accepted. Further, operation of requesting printing of the designated pages is performed, a printing request indicating to make a request for printing is accepted. In the exemplary embodiment, a page is used as an example of a part, a page number is used as an example of part-designation information, designation of the print processing is used as an example of processing-designation information that designates print processing, duplex-print designation is also used as an example of processing-designation information that designates duplex-print processing, aggregate-print designation is used as another example of processing-designation information that designates aggregate-print processing, and the operation accepting unit 22 is provided as an example of an accepting unit that accepts the part-designation information and the processing-designation information. Further, the printing request is used as an example of printing request information, and the operation accepting unit 22 is provided as an example of an accepting unit that accepts the part-designation information, the processing-designation information and the printing request information.

The thumbnail image generating unit 23 retains pages, of the pages of the electronic document stored in the electronic document storing unit 21, corresponding to the page numbers accepted by the operation accepting unit 22, and generates thumbnail images by reducing those pages. Moreover, when the operation accepting unit 22 accepts the designation of the print processing (such as the duplex print or the aggregate print), the thumbnail image generating unit 23 also retains pages for printing which are generated by performing a layout on the retained pages in accordance with the designation of the processing in printing. In the exemplary embodiment, the thumbnail image is used as an example of a specific image, and the thumbnail image generating unit 23 is provided as an example of a generating unit that generates the specific image.

The thumbnail image storing unit 24 stores the thumbnail images generated by the thumbnail image generating unit 23.

By use of the thumbnail images stored in the thumbnail image storing unit 24, the frame generating unit 25 generates: a frame of an initial image for displaying the initial image; frames for animation display of the processes in print processing; a frame of aligned images for displaying the images aligned after being subjected to the print processing; and a frame of a finished image for displaying the finished image in which the aligned images are finished as a completed one.

The frame storing unit 26 stores the frame for animation display of the processes in print processing, the frame for the aligned images and the frame of the finished image, which have been generated by the frame generating unit 25.

The display controller 27 exerts control on the frame of the initial image generated by the frame generating unit 25 to be displayed on the operation panel 15, and thereafter, sequentially takes the frames out of the frame storing unit 26 that stores thereof, and exerts control on these frames to be sequentially displayed on the operation panel 15. In the exemplary embodiment, the display controller 27 is provided as an example of a controller that exerts control to display the processes on the display screen.

The print data outputting unit 29 outputs data for printing the pages for printing retained in the thumbnail image generating unit 23 to the image forming unit 17.

It should be noted that these functional units are implemented by cooperation of software and hardware resources. Specifically, the CPU 11 reads the programs for implementing the operation accepting unit 22, the thumbnail generating unit 23, the frame generating unit 25, the display controller 27 and the print data outputting unit 29 from the HDD 14 into the RAM 12, and executes thereof to thereby implement these functional units. In addition, the electronic document storing unit 21, the thumbnail image storing unit 24 and the frame storing unit 26 are implemented by, for example, the HDD 14.

Next, operations of the image processing device 10 will be described.

Figure 8:
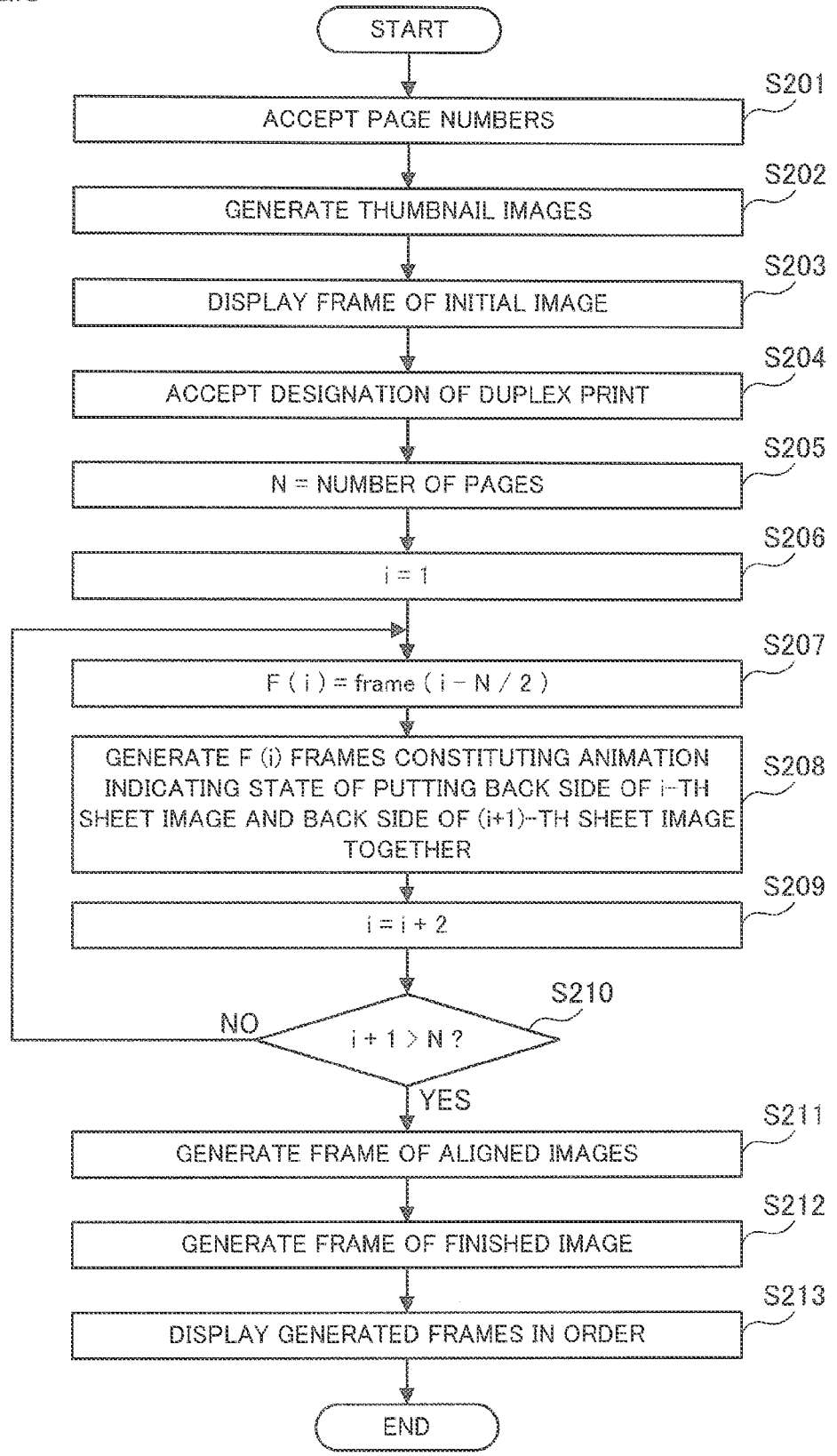
FIG. 8 is a flowchart showing an example of operations of the image processing device in the case where the duplex print is designated as print processing.

FIG. 8 is a flowchart showing an example of operations of the image processing device 10 in the case where the duplex print is designated as the print processing. It should be noted that the example of operations corresponds to the display examples shown in FIGS. 2A to 2F.

The operations of the flowchart are started by designation of pages to be printed of an electronic document on the operation panel 15 by a user.

When the operations are started, in the image processing device 10, the operation accepting unit 22 accepts the page numbers of the pages to be printed of the electronic document (step 201).

Then, the thumbnail image generating unit 23 generates thumbnail images of the pages corresponding to the page numbers accepted in step 201 from among the pages of the electronic document stored in the electronic document storing unit 21 (step 202). It should be noted that, at this time, the thumbnail image generating unit 23 stores a copy of the pages before generation of the thumbnail images in a memory of its own. The thumbnail images having been generated are stored in the thumbnail image storing unit 24.

Next, the frame generating unit 25 generates a frame of an initial image by use of the thumbnail images stored in the thumbnail image storing unit 24, and the display controller 27 exerts control on the display of this frame, and thereby the frame of the initial image is displayed on the operation panel 15 (step 203). It should be noted that the frame generated here is the frame shown in FIG. 2A in the specific examples of FIGS. 2A to 2F.

When the frame of the initial image is displayed on the operation panel 15, the user checks the display and performs an operation to designate processing such as the duplex print and the aggregate print on the operation panel 15. Here, it is assumed that an operation to designate the processing of the duplex print is performed. Then, in the image processing device 10, the operation accepting unit 22 accepts the designation of the duplex print (step 204).

This causes the frame generating unit 25 to start processing of generation of a frame for animation display of the processes in the duplex print processing.

When the processing is started, first, the frame generating unit 25 substitutes the number of the pages to be printed into a variable N (step 205).

Next, the frame generating unit 25 substitutes 1 into a variable i to count the number of sheet images (step 206), and repeats the process to generate a frame for the variable i while performing addition to the variable i by twos.

Here, the processing to generate a frame for the variable i is as follows.

First, frame (i−N/2) is substituted into a variable F (i) that represents the number of frames with respect to the variable i (step 207). Then, F (i) frames constituting animation, which indicates the state of putting the backside of the i-th sheet image and the backside of the (i+1)-th sheet image together, are generated (step 208). It should be noted that the frames generated here are: the frames shown in FIG. 2B when the variable i is 1; the frames shown in FIG. 2C when the variable i is 3; and the frames shown in FIG. 2D when the variable i is 5, among the specific examples shown in FIGS. 2A to 2F. In FIGS. 2B to 2D, only one state is shown with respect to a single value of the variable i; however, actually, frames corresponding to several states with respect to the single value of the variable i are generated. For example, when the variable i is 1, other than the frame indicating the state shown in FIG. 2B, frames corresponding to the states of plural time points, which start from a time point where the first sheet image and the second sheet image begin to approach to a time point where the sheet images are completely overlaid, are generated.

In this manner, several frames are generated with respect to the variable i, and the number thereof is provided as F (i) as described above. If it is assumed that a speed of putting the sheet images together is the same for all the values of the variable i, F (i) may be a fixed value irrespective of the value of the variable i; however, in the exemplary embodiment, F (i) is set as a function value of frame (i−N/2) with a degree of separation from the center page as a parameter to make a difference in the speed of putting the sheet images together between the both end portions and the intermediate portion. Here, if the purpose is to simply make a difference in the speed of putting the sheet images together between the both end portions and the intermediate portion, frame (x) may be any function except for a function having a fixed value. On the other hand, in the case where the purpose is to respond to a request of carefully observing the state of putting the sheet images together in the both end portions, though there is no need to carefully observe the state of putting the sheet images together in the intermediate portion, frame (x) may be a monotonically non-decreasing function where frame $(x_1)$ ≤frame $(x_2)$ holds for $x_1 < x_2$. For example, setting frame (x) to be a monotonically non-decreasing function includes that the number of frames with respect to the variable i is provided as F1 for same percentage of the sheet images in the both end portions, while the number of frames with respect to the variable i is provided as F2, which is extremely smaller than F1, for the sheet images sandwiched between the sheet images in both end portions.

It should be noted that the frames generated here are stored in the frame storing unit 26. On that occasion, it is assumed that several frames generated with respect to the variable i are stored in the order of time when the states represented by the frames occur.

Thereafter, the frame generating unit 25 adds 2 to the variable i (step 209), and determines whether or not the value obtained by adding 1 to the variable i becomes larger than the value of the variable N (step 210). As a result, if it is determined that the value obtained by adding 1 to the variable i is not larger than the value of the variable N, the process returns to step 207. On the other hand, if it is determined that the value obtained by adding 1 to the variable i is larger than the value of the variable N, the process proceeds to step 211.

To be described in more detail, in the case where the value of the variable N is an odd number, the processes of steps 207 to 209 are performed up to i=N−2; however, when it comes to i=N, the process proceeds to step 211. Further, in the case where the value of the variable N is an even number, the processes of steps 207 to 209 are performed up to i=N−1; however, when it comes to i=N+1, the process proceeds to step 211. For example, since N=7 in FIGS. 2A to 2F, the processes of steps 207 to 209 are performed up to the fifth sheet image and the sixth sheet image; however, when it comes to the seventh sheet image, the process proceeds to step 211 without performing the processes of steps 207 to 209.

Then, the frame generating unit 25 generates a frame for aligned images in which sheet images obtained by putting two sheet images together in step 208 are aligned (step 211). However, if the value of the variable N is an odd number, the last sheet image is included in the frame of aligned images as it is. It should be noted that the frame generated here is the frame shown in FIG. 2E in the specific examples of FIGS. 2A to 2F. Further, the generated frame is stored in the frame storing unit 26.

Thereafter, the frame generating unit 25 generates a frame of a finished image in which sheet images aligned in step 211 are bundled (step 212). It should be noted that the frame generated here is the frame show in FIG. 2F in the specific examples of FIGS. 2A to 2F. Further, the generated frame is stored in the frame storing unit 26.

When various kinds of frames are stored in the frame storing unit 26 in this way, the display controller 27 reads the frames from the frame storing unit 26 in the order of being stored, and exerts control on the display of these frames, and thereby the processes in the duplex print processing are displayed on the operation panel 15 (step 213). On that occasion, the display controller 27 sets the same time for displaying each frame, to thereby slow the operation in a page where many frames are generated, while accelerate the operation in a page where generated frames are small in number.

It should be noted that, at this time, the thumbnail image generating unit 23 performs layout conversion based on the designation of the duplex print accepted in step 204 on the copy of the pages stored in the memory of its own.

When the processes of the duplex print processing are displayed on the operation panel 15 in this manner, the user checks the display and performs an operation to make a request for the duplex print of the designated pages on the operation panel 15. Then, in the image processing device 10, the operation accepting unit 22 accepts the request for printing, and the print data outputting unit 29 outputs the print data, which is based on the pages subjected to the layout conversion and stored in the memory of the thumbnail image generating unit 23, to the image forming unit 17.

It should be noted that, in this operation example, the number of frames with respect to the variable i is determined in step 207 and the frames of the determined number are formed in step 208 for controlling the speed of animation display of the processes in the duplex print processing; however, the operation is not limited thereto. For example, it may be allowed to determine the display time per one frame with respect to the variable i in step 207, generate the same number of frames irrespective of the variable i in step 208 and store the frames to be associated with the determined display time, and thereby to display each frame for the display time associated therewith. Further, with more generalization, a method may be employed such that the speed of the animation display per each value of the variable i becomes the speed responding to the value of the variable i. Here, the value of the variable i is an example of the order of selecting the specific image.

Figure 9:
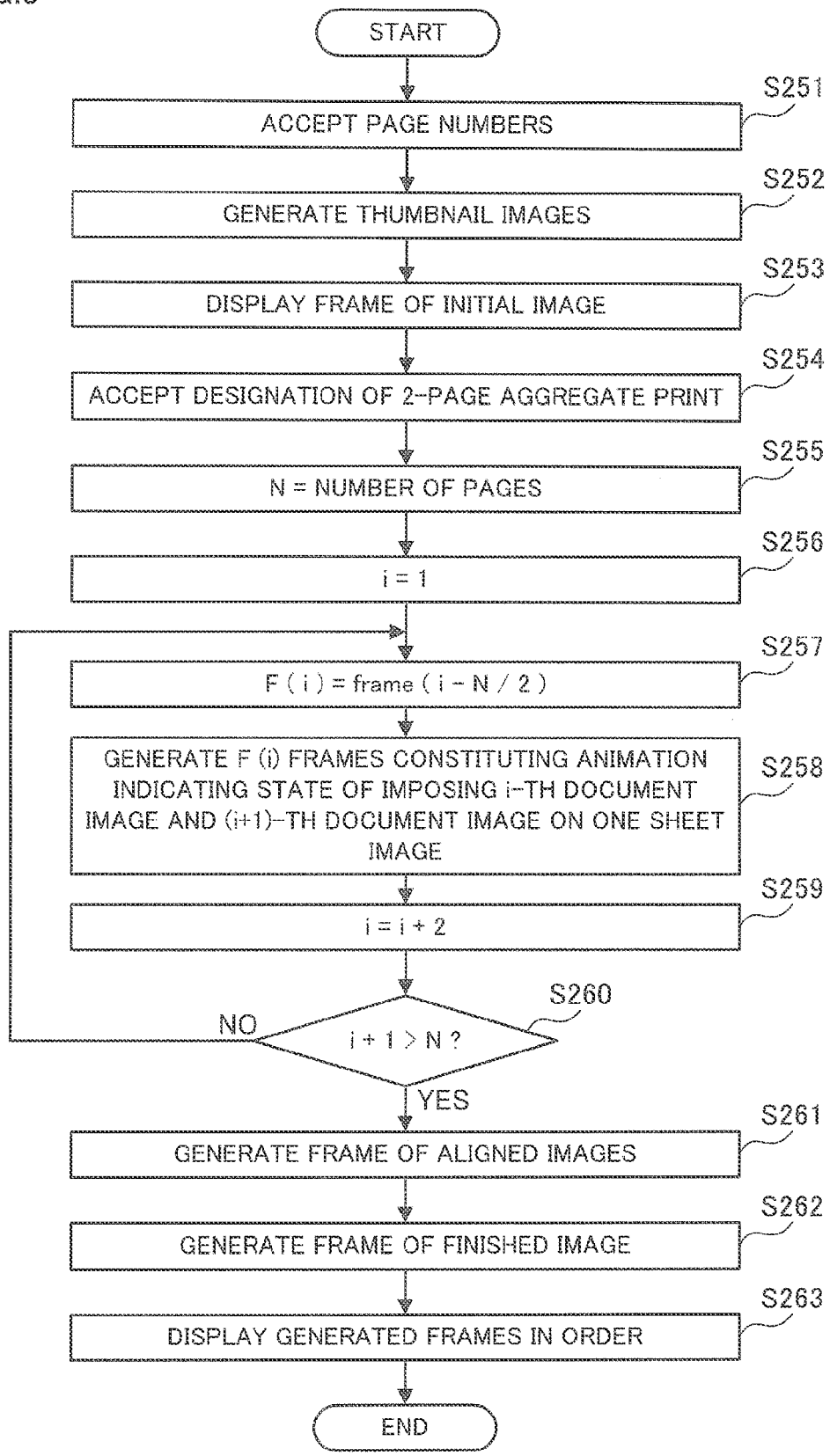
FIG. 9 is a flowchart showing an example of an operation of the image processing device in the case where the 2-page aggregate print is designated as print processing.

FIG. 9 is a flowchart showing an example of operations of the image processing device 10 in the case where the 2-page aggregate print is designated as the print processing. It should be noted that the example of operations corresponds to the display examples shown in FIGS. 3A to 3F. However, a description herein will be given on the assumption that, when the two document images are brought near to each other and are reduced as shown in FIGS. 3B and 3C, imposition on the sheet images shown in FIG. 3E is also performed.

The operations of the flowchart are started by designation of pages to be printed of an electronic document on the operation panel 15 by a user.

When the operations are started, in the image processing device 10, the operation accepting unit 22 accepts the page numbers of the pages to be printed of the electronic document (step 251).

Then, the thumbnail image generating unit 23 generates thumbnail images of the pages corresponding to the page numbers accepted in step 251 from among the pages of the electronic document stored in the electronic document storing unit 21 (step 252). It should be noted that, at this time, the thumbnail image generating unit 23 stores a copy of the pages before generation of the thumbnail images in a memory of its own. The thumbnail images having been generated are stored in the thumbnail image storing unit 24.

Next, the frame generating unit 25 generates a frame of an initial image by use of the thumbnail images stored in the thumbnail image storing unit 24, and the display controller 27 exerts control on the display of this frame, and thereby the frame of the initial image is displayed on the operation panel 15 (step 253). It should be noted that the frame generated here is the frame shown in FIG. 3A in the specific examples of FIGS. 3A to 3F.

When the frame of the initial image is displayed on the operation panel 15, the user checks the display and performs an operation to designate processing such as the duplex print and the aggregate print on the operation panel 15. Here, it is assumed that an operation to designate the processing of the 2-page aggregate print is performed. Then, in the image processing device 10, the operation accepting unit 22 accepts the designation of the 2-page aggregate print (step 254).

This causes the frame generating unit 25 to start processing of generation of frames for animation display of the processes in the 2-page aggregate print processing.

When the processing is started, first, the frame generating unit 25 substitutes the number of the pages to be printed into a variable N (step 255).

Next, the frame generating unit 25 substitutes 1 into a variable i to count the number of sheet images (step 256), and repeats the process to generate a frame for the variable i while performing addition to the variable i by twos.

Here, the process to generate a frame for the variable i is as follows.

First, frame (i−N/2) is substituted into a variable F (i) that represents the number of frames with respect to the variable i (step 257). Then, F (i) frames constituting animation, which indicates the state where the i-th sheet image and the (i+1)-th sheet image are brought near to each other and are reduced to be imposed on one sheet image, are generated (step 258). It should be noted that the frames generated here are: when the variable i is 1, the frames indicating the state where the two document images, which have been brought near to each other and reduced in FIG. 3B, are imposed on one sheet image; and when the variable i is 5, the frames indicating the state where the two document images, which have been brought near to each other and reduced in FIG. 3C, are imposed on one sheet image, among the specific examples shown in FIGS. 3A to 3F. In FIGS. 3B and 3C, only one state is shown with respect to a single value of the variable i; however, actually, frames corresponding to several states with respect to the single value of the variable i are generated. For example, when the variable i is 1, frames corresponding to the states of plural time points, which start from a time point where the first sheet image and the second sheet image begin to approach to a time point where imposition on the sheet image is performed, are generated.

In this manner, several frames are generated with respect to the variable i, and the number thereof is provided as F (i) as described above. It should be noted that, since the description has already been given to F (i) and the function value frame (i−N/2) substituted thereto with reference to FIG. 8, the description here is omitted.

It should be noted that the frames generated here are stored in the frame storing unit 26. On that occasion, it is assumed that several frames generated with respect to the variable i are stored in the order of time when the states represented by the frames occur.

Thereafter, the frame generating unit 25 adds 2 to the variable i (step 259), and determines whether or not the value obtained by adding 1 to the variable i becomes larger than the value of the variable N (step 260). As a result, if it is determined that the value obtained by adding 1 to the variable i is not larger than the value of the variable N, the process returns to step 257. On the other hand, if it is determined that the value obtained by adding 1 to the variable i is larger than the value of the variable N, the process proceeds to step 261.

To be described in more detail, in the case where the value of the variable N is an odd number, the processes of steps 257 to 259 are performed up to i=N−2; however, when it comes to i=N, the process proceeds to step 261. Further, in the case where the value of the variable N is an even number, the processes of steps 257 to 259 are performed up to i=N−1; however, when it comes to i=N+1, the process proceeds to step 261. For example, since N=7 in FIGS. 3A to 3F, the processes of steps 257 to 259 are performed up to the fifth sheet image and the sixth sheet image; however, when it comes to the seventh sheet image, the process proceeds to step 261 without performing the processes of steps 257 to 259.

Then, the frame generating unit 25 generates a frame of aligned images in which sheet images having document images imposed thereon in step 258 are aligned (step 261). However, if the value of the variable N is an odd number, the last sheet image is reduced and imposed on the left half of a sheet image to be included in the frame of aligned images. It should be noted that the frame generated here is the frame shown in FIG. 3E in the examples of FIGS. 3A to 3F. Further, the generated frame is stored in the frame storing unit 26.

Thereafter, the frame generating unit 25 generates a frame of a finished image in which sheet images aligned in step 261 are bundled (step 262). It should be noted that the frame generated here is the frame shown in FIG. 3F in the specific examples of FIGS. 3A to 3F. Further, the generated frame is stored in the frame storing unit 26.

When various kinds of frames are stored in the frame storing unit 26 in this way, the display controller 27 reads the frames from the frame storing unit 26 in the order of being stored, and exerts control on the display of these frames, and thereby the processes in the 2-page aggregate print processing are displayed on the operation panel 15 (step 263). On that occasion, the display controller 27 sets the same time for displaying each frame, to thereby slow the operation in a page where many frames are generated, while accelerating the operation in a page where generated frames are small in number.

It should be noted that, at this time, the thumbnail image generating unit 23 performs layout conversion based on the designation of the 2-page aggregate print accepted in step 254 on the copy of the pages stored in the memory of its own.

When the processes of the 2-page aggregate print processing are displayed on the operation panel 15 in this manner, the user checks the display and performs an operation to make a request for the 2-page aggregate print of the designated pages on the operation panel 15. Then, in the image processing device 10, the operation accepting unit 22 accepts the request for printing, and the print data outputting unit 29 outputs the print data, which is based on the pages subjected to the layout conversion and stored in the memory of the thumbnail image generating unit 23, to the image forming unit 17.

It should be noted that, in this example of operations, it is assumed that F (i) frames constituting animation, which indicates the state where the i-th sheet image and the (i+1)-th sheet image are brought near to each other and are reduced to be imposed on one sheet image, are generated in step 258; however, the operation is not limited thereto. For example, the configuration may be such that F (i) frames constituting animation, which indicates the state where the i-th sheet image and the (i+1)-th sheet image are brought near to each other and are reduced, are generated as frames to be displayed earlier, and F (i) frames constituting animation, which indicates the state where the i-th sheet image and the (i+1)-th sheet image are imposed on one sheet image, are generated as frames to be displayed later. Or, the configuration may be such that some frames constituting animation, which indicates the state where the process to bring two documents near to each other and reduce thereof is concurrently performed on all of the document images, are generated as frames to be displayed earlier, and F (i) frames constituting animation, which indicates the state where the i-th sheet image and the (i+1)-th sheet image are imposed on one sheet image, are generated as frames to be displayed later.

Further, in this operation example, the number of frames with respect to the variable i is determined in step 257 and the frames of the determined number are formed in step 258 for controlling the speed of animation display of the processes in the 2-page aggregate print processing; however, the operation is not limited thereto. For example, it may be allowed to determine the display time per one frame with respect to the variable i in step 257, generate the same number of frames irrespective of the variable i in step 258 and store the frames to be associated with the determined display time, and thereby to display each frame for the display time associated therewith. Further, with more generalization, a method may be employed such that the speed of the animation display per each value of the variable i becomes the speed responding to the value of the variable i. Here, the value of the variable i is an example of the order of selecting the specific image.

Incidentally, in the exemplary embodiment, the example of operations to achieve the display example in FIGS. 2A to 2F is shown by the flowchart in FIG. 8 and the example of operations to achieve the display example in FIGS. 3A to 3F is shown by the flowchart in FIG. 9, while operation examples to achieve the display examples in FIGS. 4A to 4D, FIGS. 5A to 5C and FIGS. 6A to 6H are not explicitly shown. However, the display examples in these figures are shown by combining the flowcharts in FIGS. 8 and 9, or adding a slight modification to these flowcharts.

in other words, an example of operations to achieve the display example in FIGS. 4A to 4D is shown by a flowchart in which steps up to step 261 in the flowchart in FIG. 9 are followed by step 205 and steps subsequent thereto in the flowchart in FIG. 8.

In addition, an example of operations to achieve the display example in FIGS. 5A to 5C is shown by a flowchart in which steps up to step 211 in the flowchart in FIG. 8 are followed by a step of generating a frame indicating an operation to separate document images from the front side and backside of each sheet image, and thereafter, followed by step 255 and subsequent steps in the flowchart in FIG. 9.

Further, an example of operations to achieve the display example in FIGS. 6A to 6H is shown by a flowchart in which steps up to step 254 in the flowchart in FIG. 9, where step 254 is modified to accept designation of the saddle-stitch bookbinding, are followed by a step of generating a frame indicating an operation to rearrange the document images as shown in FIG. 6C, then followed by steps 255 to 261 in the flowchart in FIG. 9, and thereafter, followed by step 205 and steps subsequent thereto in the flowchart in FIG. 8.

Moreover, in the exemplary embodiment, the description has been given to the animation display of the processes in print processing; however, the present invention is not limited thereto. For example, on the occasion of change of setting from color printing to monochrome printing, change of contrast setting, change of a binding margin or the like, animation may be provided between the state before changing and the state after changing for making it easy to understand an amount of change.

Further, in the exemplary embodiment, the description has been given on the assumption that the operation to perform animation display of the processes in print processing is executed by the image processing device 10; however, the operation may be executed by any device.

Accordingly, on an assumption that such operation is executed by a computer 90, a hardware configuration of the computer 90 will be described.

Figure 10:
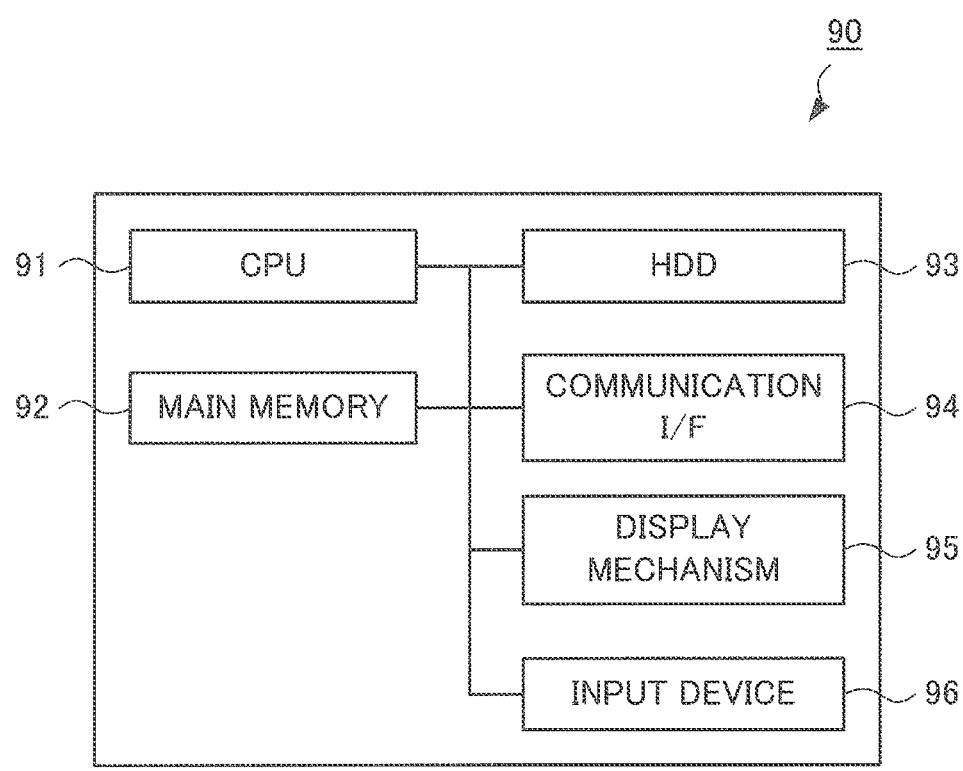
FIG. 10 is a diagram showing an example of a hardware configuration of a terminal device to which the exemplary embodiment according to the present invention is applied.

FIG. 10 is a diagram showing a hardware configuration of the computer 90.

As shown in FIG. 10, the computer 90 includes a central processing unit (CPU) 91 as an arithmetic unit, a main memory 92 as a storing unit and a magnetic disk device (HDD: Hard Disk Drive) 93. Here, the CPU 91 executes an operating system (OS) and various kinds of software such as application, and achieves various processing units as described above. The main memory 92 stores various kinds of software, data used for executing the software and the like, while the magnetic disk device 93 stores input data to various kinds of software, output data from various kinds of software and the like, and at least one of the main memory 92 and the magnetic disk device 93 achieves above-described each storing unit.

Furthermore, the computer 90 includes a communication I/F 94 that performs communication with external devices, a display mechanism 95 including a video memory, a display and the like, and an input device 96 such as a keyboard and a mouse.

The program that achieves the exemplary embodiment may be provided not only by a communication unit but also by being stored in a recording medium such as a CD-ROM.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

APPENDIX

A technique is known in which, in a print control device performing printing control based on printing data to be processed and printing attribute information set to the printing data, the layout preview of the printing data is displayed based on the printing data and the setting related to layout if a change is made in the setting related to the layout out of the printing attribute information, and the output form preview of the printing data is displayed based on the printing data and printing attribute information (refer to Japanese Patent Application Laid-Open Publication No. 2004-102614).

APPENDIX

A technique is known in which, in a preview image showing image data obtained by continuous duplex reading, a preview image for setting both surfaces or double-page spread and an auxiliary preview image not for setting are paired and at least the preview image for setting is displayed, and the pages are turned while switching between the preview image for setting and the auxiliary preview image (refer to Japanese Patent Application Laid-Open Publication No. 2008-226050)

APPENDIX

A technique is known in which an icon indicating the folding variation out of a large number of ones is displayed on a screen for setting the folding method in an easily understandable manner from the viewpoint of the user, and further, more understandable preview display is executed even on a preview screen by simultaneously displaying the folding position, the folding method, and the folding procedure together with the actual printing content (refer to Japanese Patent Application Laid-Open Publication No. 2010-116241).

APPENDIX

A technique is known in which, in displaying print preview images of the page images on the basis of double-sided printing data for plural pages, each of the page images for two pages subsequent to a specified page can be turned over and displayed for each page image set at N in1 with respect to a region corresponding to a rear surface of an uppermost surface recording material in a state that a part of the uppermost surface recording material is turned over from a state that the recording materials are stacked and a region corresponding to a front surface of a second sheet of recording material (refer to Japanese Patent Application Laid-Open Publication No. 2010-028255).

What is claimed is:

1. A display control device comprising:
an accepting unit that accepts part-designation information for designating a plurality of parts to be printed included in data and processing-designation information for designating print processing that performs predetermined processing on every K parts of the plurality of parts, where K is an integer not less than 2;
a generating unit that generates a plurality of specific images for specifying contents of the plurality of respective parts designated by the part-designation information accepted by the accepting unit; and
a controller that, when the accepting unit accepts the processing-designation information, exerts control so that a process for performing an operation to select K specific images from the plurality of specific images generated by the generating unit and to change a state of the K specific images in accordance with the predetermined processing in order while changing the K specific images to be selected is displayed on a display screen.

2. The display control device according to claim 1, wherein the controller exerts control so that the operation to select the K specific images from the plurality of specific images generated by the generating unit and to change the state of the K specific images in accordance with the predetermined processing is performed with a speed in accordance with an order of selecting the K specific images.

3. The display control device according to claim 2, wherein the controller exerts control so that the operation to select the K specific images from the plurality of specific images generated by the generating unit and to change the state of the K specific images in accordance with the predetermined processing is performed with a speed equal to or faster than a speed in a previous operation in the process in a case where the order of selecting the K specific images is earlier than a specific order, and is performed with a speed equal to or slower than the speed in the previous operation in the process in a case where the order of selecting the K specific images is later than the specific order.

4. A display control device comprising:
an accepting unit that accepts part-designation information for designating a plurality of parts to be printed included in data and processing-designation information for designating duplex-print processing that prints, for every two parts of the plurality of parts, one of the two parts on one surface of a recording medium and the other of the two parts on the other surface of the recording medium;
a generating unit that generates a plurality of specific images for specifying contents of the plurality of respective parts designated by the part-designation information accepted by the accepting unit; and
a controller that, when the accepting unit accepts the processing-designation information, exerts control so that a process for performing an operation to select two specific images from the plurality of specific images generated by the generating unit and to put a backside of one of the two specific images and a backside of the other one of the two specific images together in order while changing the two specific images to be selected is displayed on a display screen.

5. A display control device comprising:
an accepting unit that accepts part-designation information for designating a plurality of parts to be printed included in data and processing-designation information for designating aggregate-print processing that performs, on every K parts of the plurality of parts, aggregate print on the K parts on a recording medium, where K is an integer not less than 2;
a generating unit that generates a plurality of specific images for specifying contents of the plurality of respective parts designated by the part-designation information accepted by the accepting unit; and
a controller that, when the accepting unit accepts the processing-designation information, exerts control so that a process for performing an operation to select K specific images from the plurality of specific images generated by the generating unit and to impose the K specific images on an image of a recording medium in order while changing the K specific images to be selected is displayed on a display screen.

6. A printing apparatus comprising:
an accepting unit that accepts part-designation information for designating a plurality of parts to be printed included in data, processing-designation information for designating print processing that performs predetermined processing on every K parts of the plurality of parts, where K is an integer not less than 2, and printing request information for making a request to print the plurality of parts;
a generating unit that generates a plurality of specific images for specifying contents of the plurality of respective parts designated by part-designation information accepted by the accepting unit;
a display unit that, when the accepting unit accepts the processing-designation information, displays a process for performing an operation to select K specific images from the plurality of specific images generated by the generating unit and to change a state of the K specific images in accordance with the predetermined process in order while changing the K specific images to be selected; and
a printing unit that, when the accepting unit accepts the printing request information after the process is displayed by the display unit, prints the plurality of parts in a state where the print processing has been performed.

7. A display control method comprising:
accepting part-designation information for designating a plurality of parts to be printed included in data and processing-designation information for designating print processing that performs predetermined processing on every K parts of the plurality of parts, where K is an integer not less than 2;
generating a plurality of specific images for specifying contents of the plurality of respective parts designated by the part-designation information; and
controlling so that, upon accepting the processing-designation information, a process for performing an operation to select K specific images from the plurality of specific images and to change a state of the K specific images in accordance with the predetermined process in order while changing the K specific images to be selected is displayed on a display screen.

8. A non-transitory computer readable medium storing a program that causes a computer to execute a process for display controlling, the process comprising:
accepting part-designation information for designating a plurality of parts to be printed included in data and processing-designation information for designating print processing that performs predetermined processing on every K parts of the plurality of parts, where K is an integer not less than 2;

generating a plurality of specific images for specifying contents of the plurality of respective parts designated by the part-designation information; and controlling so that, upon accepting the processing-designation information, a process for performing an operation to select K specific images from the plurality of specific images and to change a state of the K specific images in accordance with the predetermined process in order while changing the K specific images to be selected is displayed on a display screen.

\* \* \* \* \*